US 6,671,424 B1

United States Patent
Skoll et al.

(10) Patent No.: US 6,671,424 B1
(45) Date of Patent: Dec. 30, 2003

(54) PREDICTIVE IMAGE CACHING ALGORITHM

(75) Inventors: David F. Skoll, Ottawa (CA); Vlad Dobrotescu, Nepean (CA)

(73) Assignee: Chipworks, Ottawa (CA)

( * ) Notice: Subject to any disclaimer, the term of this patent is extended or adjusted under 35 U.S.C. 154(b) by 728 days.

(21) Appl. No.: 09/625,546

(22) Filed: Jul. 25, 2000

(51) Int. Cl.[7] .............................. G06K 9/54; G06F 12/00
(52) U.S. Cl. ........................................ 382/305; 711/118
(58) Field of Search ................................. 382/141, 284, 382/298, 305; 711/100, 118, 122, 204; 345/600, 800; 348/240.99; 710/33, 44; 709/219, 240

(56) References Cited

U.S. PATENT DOCUMENTS

| | | | | |
|---|---|---|---|---|
| 5,686,960 A | * | 11/1997 | Sussman et al. ............. | 348/218 |
| 5,710,835 A | | 1/1998 | Bradley ...................... | 382/233 |
| 5,761,406 A | * | 6/1998 | Kobayashi et al. ......... | 395/182 |
| 5,889,951 A | * | 3/1999 | Lombardi ................... | 395/200 |
| 5,924,116 A | * | 7/1999 | Aggarwal et al. .......... | 711/122 |
| 6,016,520 A | | 1/2000 | Facq et al. .................. | 710/33 |
| 6,185,625 B1 | * | 2/2001 | Tso et al. .................... | 709/247 |
| 6,425,057 B1 | * | 7/2002 | Cherkasova et al. ........ | 711/134 |

* cited by examiner

Primary Examiner—Bhavesh M. Mehta
Assistant Examiner—Kanji Patel
(74) Attorney, Agent, or Firm—Max R. Wood; Ogilvy Renault (57) ABSTRACT

Methods of caching tile image constituents of image-mosaics enable a substantially smooth real-time display of portions of the image-mosaic in a view during panning, resizing, or zooming of the view. The method includes using a predictive algorithm to identify tile images to be retrieved from a remote store through a local area network, and for sequencing requests for the retrieval of tile images from the remote store. A scheduler calculates time spent in retrieving and servicing each tile image retrieval request and proportionately pauses retrieval of tile images after each request is serviced in order to prevent over utilizing LAN resources. The advantages are that tile images to be displayed are cached in accordance with a priority to facilitate image display while network data transfers are distributed in time.

31 Claims, 9 Drawing Sheets

PREDICTIVE IMAGE CACHING ALGORITHM

TECHNICAL FIELD

The invention relates to the display of digital images, and in particular to a system for displaying, in substantially real-time, an image-mosaic consisting of a plurality of tile images.

BACKGROUND OF THE INVENTION

In the field of reverse engineering of semiconductor integrated circuits (IC), surfaces of sample ICs are micro-imaged as the sample ICs are deconstructed for purposes of design and layout extraction. The micro-images are displayed at a workstation to permit an analyst to extract the design and layout of the IC. The data required to display the images is characterized by being complex, and it may require processing prior to its display.

As described in co-pending application Ser. No. 09/594,169, filed Jun. 15, 2000, and entitled "METHOD AND SYSTEM FOR RECALIBRATION DURING MICRO-IMAGING TO DETERMINE THERMAL DRIFT", the image data is acquired in increments. Each increment is a tile image constituent of an image-mosaic. Each image-mosaic is representative of a surface of interest of a sample IC die at a deconstructive step in reverse engineering the IC. Tile images are typically stored in a high capacity data storage.

In order to extract design and layout information from the image data, selected groups of tile images are requested from the high capacity data storage, assembled into portions of image-mosaics, and the assembled portions of image-mosaics are displayed on a man-machine interface. The selected groups of tile images are representative of a specific area of the surface of interest of the sample IC, at a specific deconstructive step and at a specific magnification. The analyst visually inspects the image-mosaics to extract design and layout information therefrom.

Typically, the man-machine interface is implemented on a computer workstation associated with a Local Area Network (LAN). Modern computer workstations are well suited for data processing, but have limited storage capacity relative to the amount of image data required to be manipulated in reverse-engineering an IC. The high capacity storage is typically associated with a network node on the LAN.

In an arrangement as just described, the workstation is generally programmed to perform the following tasks: respond to analyst input in real-time; provide a smooth, substantially real-time display of the image data; process reverse-engineering tasks in near real-time, etc. Typically these tasks are computationally intensive and require a proportion of the processing time of the workstation.

To provide a substantially real-time display of the image data, data manipulation intensive computations are required to refresh the display. Remote access to the tile image data from the high capacity storage via the LAN is relatively slow and unsuitable for real-time update of mosaic-views. Network data transfers are slow compared to data transfers and manipulations internal to the workstation. One way to reduce the transfer delay is to store the image data in a compressed format at the high capacity storage. The compressed data can be transferred over the LAN in the same compressed format and decompressed at the workstation.

Another way to increase the responsiveness of the man-machine interface is to cache image data at the workstation. Since storage capacity is limited at the workstation, only the image data required for the display is kept. Further benefits may be gained by caching image data in expectation of its imminent use. This is known as predictive caching. Data caching heuristics are required to optimize predictive caching. The caching heuristics relate to the way an analyst uses the man-machine interface to extract design and layout information. Extraction of design and layout information consists of two principal tasks: identification of components and component interconnections. Identification of components requires the display of an area-of-interest including the components. Identification of component interconnections requires that the analyst follow traces that may traverse at least one image-mosaic representative of the sample IC.

Various caching methods of improving image processing speed are known. The most relevant to the present invention are look-ahead caching and context caching.

U.S. patent application Ser. No. 6,016,520 entitled METHOD OF VIEWING AT A CLIENT. VIEWING STATION A MULTIPLE MEDIA TITLE STORED AT A SERVER AND CONTAINING A PLURALITY OF TOPICS UTILIZING ANTICIPATORY CACHING, which issued on Jan. 18, 2000 to Facq et al. describes an implementation of context based anticipatory caching of media content in providing client-initiated server-driven remote service provision. The issue addressed is the length of time required to search a database of information at the server and transmit the information from the server to the client viewing station. In response to an initial keyword-based request for an item of media content from the server, the remote services at the server search additional items of media content likely to be requested and transmit these items to the client viewing station in advance of their request. Transmitted items are cached by services at the client viewing station in a cache storage. The client viewing station checks the cache storage before making additional requests for transfer of multiple media items over the remote connection. Although this type of on-line multiple media system provides responsive interactive presentation of information at the client viewing station, context based caching is unsuitable for manipulating tile images in reverse-engineering a sample IC, largely because it does not accommodate an expression of a "near" or "adjacent" content.

Look-ahead caching is used to provide a Central Processing Unit (CPU) with access to information it is likely to require in the immediate future. CPUs have very little memory available for processing, typically limited to a few registers. Information is usually available in storage, and is retrieved using a computer bus. In processing information the CPU performs a large number of fetch instructions. Typically the required information is available in Random Access Memory (RAM) such as semiconductor type memory accessible over the computer bus. The computer bus is also used by the CPU to access other devices and can therefore be slow to fetch information such as instructions or data, especially if the fetches are performed instruction-by-instruction. Modern computer buses have burst transfer capabilities or dedicated transfer capabilities, such as are provided by Direct Memory Access (DMA) controllers. Modern CPUs are provided with a local cache which is loaded or pre-loaded with a relatively large amount of data and instructions via the bursting capability of the bus or the DMA service. The CPU has dedicated access to the local cache for fetching the necessary data and instructions.

A great deal of work has been invested in the development of algorithms for loading or pre-loading the local cache with relevant information that the CPU needs. Since the data and instruction sets processed by CPUs are largely stored sequentially in files, these algorithms are based on look-ahead heuristics. Look-ahead caching, although suited for sequentially arranged information, does not address the problem associated with tile image display, because a group of displayed tile image required for display in reverse-engineering of ICs are not necessarily stored sequentially due to the two dimensional relationship between the tile images in a image-mosaic.

There is therefore a need for methods of predictively caching tile image constituents of an image-mosaic to provide a substantially smooth display of portions of the image-mosaic in real-time.

SUMMARY OF THE INVENTION

It is an object of the invention to provide a priority based caching algorithm adapted for caching tile images in accordance with a priority computed by a caching algorithm.

It is another object of the invention to control caching of image data to prevent an over utilization of system resources.

It is a further object of the invention to enable extraction of design and layout information via multiple workstations.

It is yet another object of the invention to distribute network data transfers to prevent overloading of an associated LAN used for data storage and transfer.

In accordance with one aspect of the invention an algorithm for caching tile image constituents of an image-mosaic to facilitate the panning or resizing of a mosaic-view of an event driven man-machine interface is provided. At least a portion of the image-mosaic including a plurality of tile images assembled in a contiguous, juxtaposed relationship is displayed in the mosaic-view. The algorithm makes use of a caching predictor for computing a retrieval priority for each tile image surrounding the panned or resized mosaic-view in a predetermined pattern and to a predetermined extent. A tile image retrieval process retrieves tile images from storage and adds the images to a cache in accordance with the priority assigned by the caching predictor.

In accordance with another aspect of the invention, there is provided a display apparatus for displaying, on an event driven man-machine interface, a plurality of tile images assembled into a image-mosaic. The display is a substantially smooth, real-time display of portions of the image-mosaic on the man-machine interface in response to interaction events. The apparatus includes a predictor for monitoring interaction events serviced by the man-machine interface for the purposes of prioritizing the downloading of tile images within a prediction region located in a vicinity of at least one group of displayed tile images. A retrieval queue is used for sequencing the retrieval of the tile images and a cache for storing the retrieved tile images. A scheduler controls the use of computation time used to update the cache.

The images cached are dependent on an allocated cache size, and a view change history which records a historical perspective of the most recent mosaic-views used by an analyst.

The advantages are that only tile images of highest priority are cached, while network data transfers are distributed in time on a priority basis based on probability of future demand.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
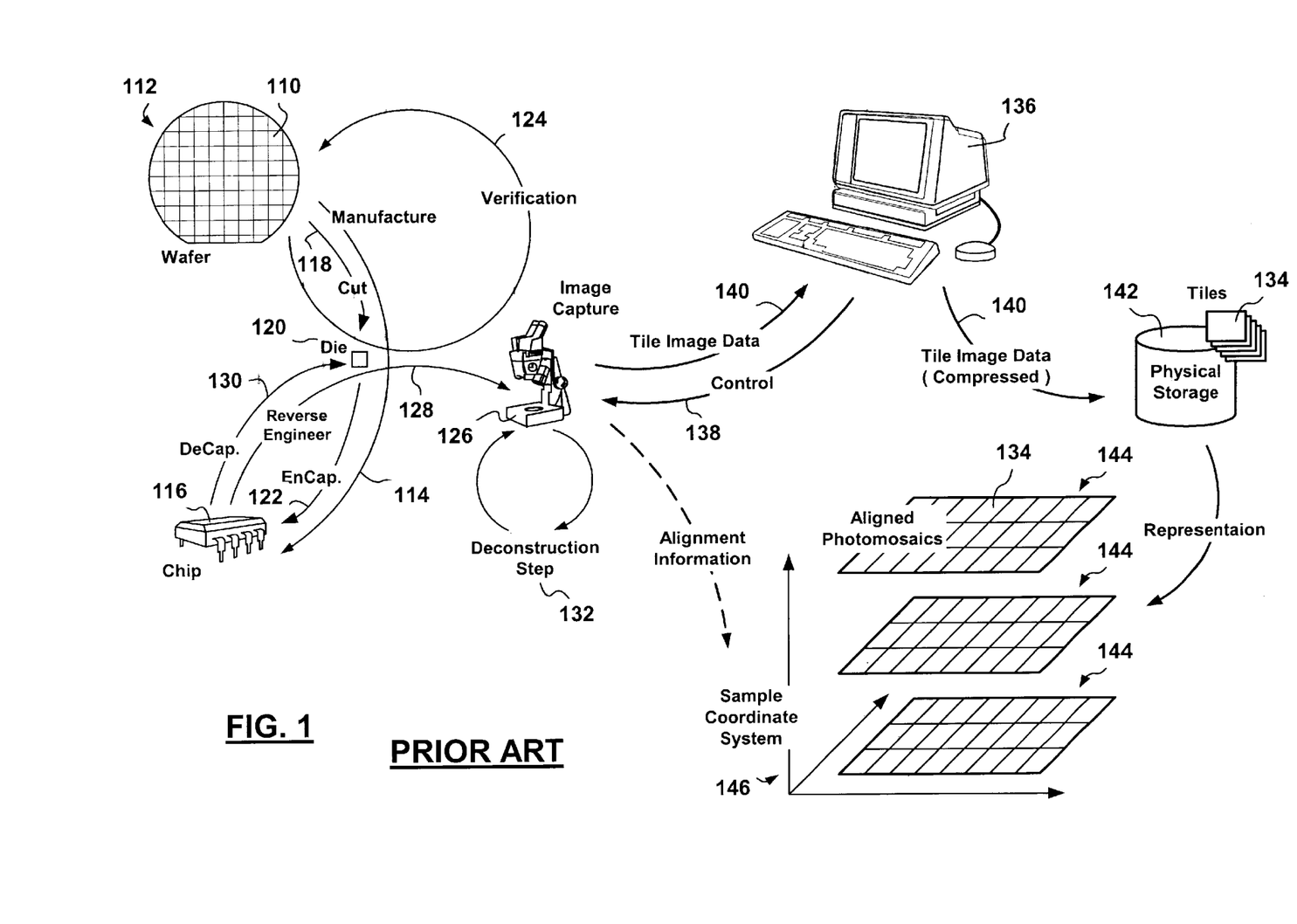
FIG. 1 is a work flow diagram showing an overview of an exemplary process by which image-mosaics representative of steps in a deconstruction of a semiconductor integrated circuit (IC) are acquired.

FIG. 1 is a work-flow diagram showing an overview of an exemplary prior art process by which image-mosaics representative of steps in the deconstruction of a semi-conductor integrated circuit (IC) are acquired. ICs 110 are fabricated on a wafer 112. The wafer 112 typically comprises a monocrystalline silicon substrate which is a natural insulator. Doping the silicon substrate with other chemical elements can change the properties of the silicon, including making the silicon substrate a semi-conductor or a conductor. Such substrate processing is performed as part of a manufacturing process 114 of chip 116. In packaging a chip 116, a die 120 is cut in a step 118 from the wafer 112 and is encapsulated in step 122 to form the chip 116.

The manufacture of integrated circuits typically involves a verification process 124 by which wafers 112, cut dies 120, or portions thereof are inspected using a micro-imaging system 126 to extract design and layout information for design validation or purposes of competitive analysis. For the purposes of product quality assurance or competitive analysis, for example, a process of reverse-engineering 128 is performed on the chip 116. A first step in the reverse-engineering process 128 is decapsulation 130 of the chip 116 to remove the die 120. Die 120 is inspected using the micro-imaging system 126 to extract design and layout information. The micro-imaging system 126 may include high magnification optical microscopes, scanning electron microscopes, field emission electron microscopes, or the like. Design and layout extraction from a die 120 or portion thereof involves a process of deconstruction 132 by which layers formed during the manufacturing process 114 are removed step-by-step.

High magnification tile images 134 of the sample die 120 are acquired between each deconstructive step 132 under the control of a computer workstation 136. The computer workstation 136 controls the micro-imaging system 126 using control signals 138. The computer workstation 136 receives tile image data 140 from the micro-imaging system 126 and saves the tile image data 140 to memory, typically high capacity storage 142, such as a hard disk. Typically the tile image data 140 is transmitted to the high capacity storage 142 and stored there in a compressed format, minimizing data transfer requirements between the computer workstation 136 and the high capacity storage 142, and minimizing data storage requirements at the high capacity storage 142.

The stored tile images 134 are assembled into image-mosaics 144, each image-mosaic 144 representing a surface of interest of the die 120 at a deconstructive step 132. During acquisition of the tile images 134 of the die 120, a sample coordinate space 146 is defined. The sample coordinate space 146 is used to align the tile images 134 and the image-mosaics 144.

Figures 2, 3:
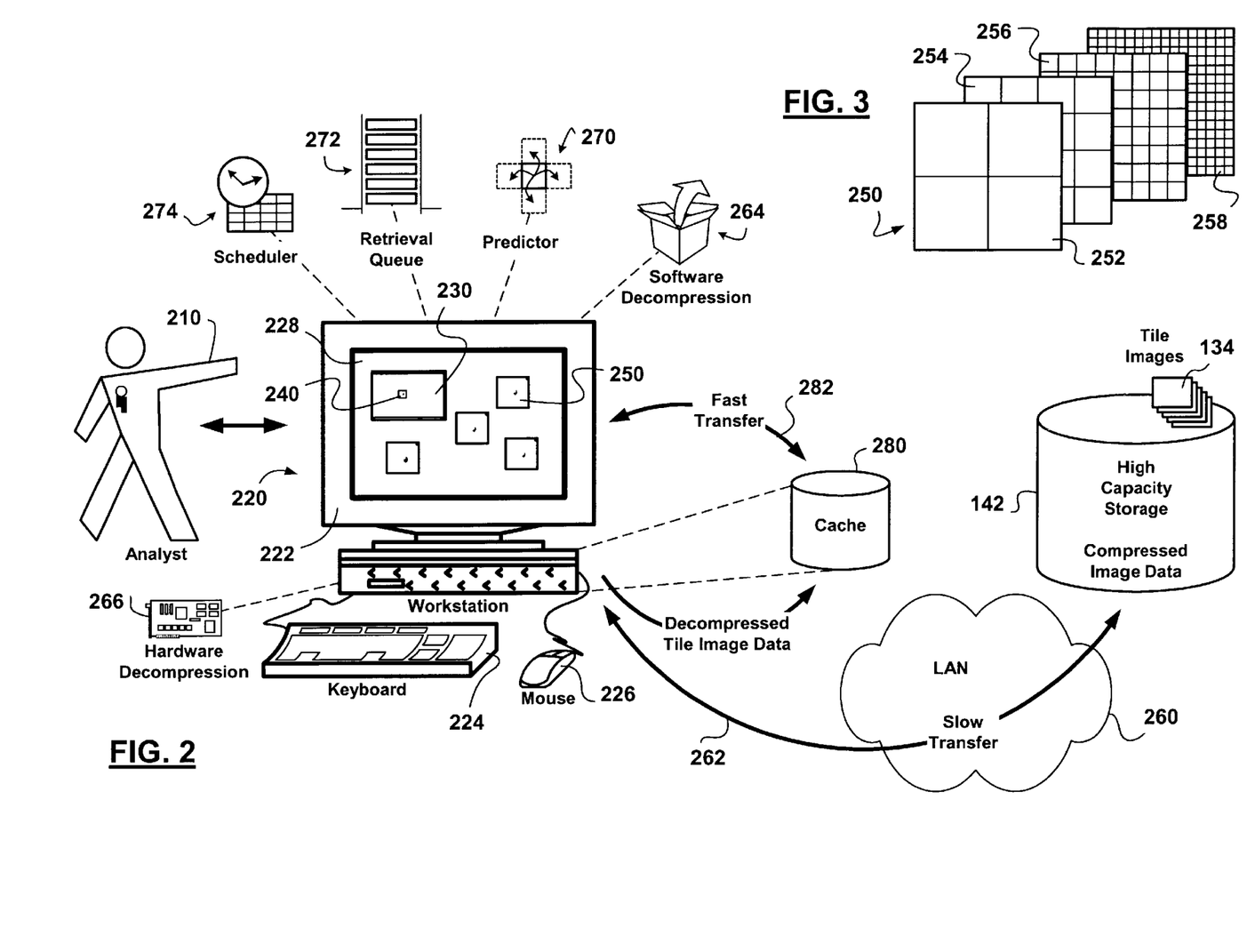
FIG. 2 is a workflow diagram showing a man-machine interface for analyzing integrated circuits (ICs) and an overview of an exemplary process by which at least a portion of an image-mosaic is displayed.
FIG. 3 is a schematic diagram of an exemplary mosaic-view which displays at least a portion of an image-mosaic at different zoom factors.

FIG. 2 is a schematic diagram showing a man-machine interface in accordance with the invention for analyzing integrated circuits (ICs). In analyzing ICs to extract design and layout information, an engineer analyst 210 utilizes a workstation 220 having a visual display 222, a keyboard 224 and a pointing device 226, such as, but not limited to, a mouse. The visual display 222 has a display area 228.

The visual display 222 is typically a Cathode Ray Tube (CRT), a Liquid Crystal Display (LCD), an image projected by an image projector, or the like. Alternatively, the man-machine interface may include a distributed visual display provided by a multi-headed visual display (not shown), a distributed windowing environment spanning visual displays 222 of a plurality of workstations 220, etc. Distributed windowing environments are commercially available from the XConsortium®, NeXTStep®/OpenStep®, etc.

The display area 228 is shown to display a navigation window 230 and mosaic-views such as 250, each having a view-boundary. The navigation window 230 provides an overall view of the sample under analysis. The navigation window 230 displays a low magnification digital image of the sample. When the sample under analysis is a single IC die or a substantial portion thereof, the low magnification image displayed in the navigation window 230 is called a die image. A slice 240 is selected in the navigation window 230 and defines an area-of-interest on the die image. An exemplary process by which a slice is created is described in co-pending United States Patent application entitled "LOCK-STEP CURSORS FOR FEATURE ALIGNMENT" filed on Jun. 27, 2000, the specification of which is incorporated herein by reference.

Mosaic-views such as 250 display a portion of an image-mosaic consisting of at least one tile image acquired after a particular deconstructive step 132 in the process of deconstructing the IC. The slice 240 defines an area-of-interest in the navigation window and displayed in each mosaic-view 250. An exemplary process by which mosaic-views are created is described in applicant's above-referenced co-pending United States Patent application entitled "LOCK-STEP CURSORS FOR FEATURE ALIGNMENT".

In accordance with a preferred embodiment of the invention, mosaic-views 250 zoom and/or pan in unison, subject to the slice 240 being zoomed or panned, as also described in the above-referenced co-pending United States Patent application entitled "LOCK-STEP CURSORS FOR FEATURE ALIGNMENT".

FIG. 3 is a schematic diagram of an exemplary mosaic-view. The mosaic-view 250 is shown displaying a portion of an image-mosaic at different zoom factors. At 252 the mosaic-view 250 displays the image-mosaic at a 1× relative magnification, at 254 the mosaic-view 250 displays the image-mosaic at 2× relative magnification, at 256 the mosaic-view 250 displays the same image-mosaic at 4× relative magnification and at 258 the mosaic-view 250 displays the same image-mosaic at 8× relative magnification. Although the image-mosaic is shown to have only four zoom factors, more or less may be used as required.

Typically the micro-imaging system 126 (FIG. 12) acquires tile images 134 at a selected magnification factor which is set to correspond to a highest zoom factor of an image-mosaic. The magnification factor used in acquiring the tile image data 140 is closely related to the finest dimensions that are to be discerned on the die 120, such as trace widths. According to the invention, image-mosaics corresponding to the same deconstructive step but at lower zoom factors are generated by performing pixel operations on the acquired tile image data 140. Typically zoom factors relate closely to the size of components on the die 120, the size of functional component blocks, etc. Therefore each tile image 134 stored in the high capacity storage 142 corresponds to a particular deconstructive step, covers a particular area of the die 120 and has a particular associated zoom factor.

FIG. 2 also shows components used in an exemplary process by which image-mosaics are displayed on the workstation 220. As mentioned above with respect to FIG. 1 tile images 134 are stored in the high capacity storage 142. The high capacity storage 142 is typically accessible through a Local Area Network (LAN) 260 from which tile images are retrieved. Retrieved tile image data 140 is decompressed at the workstation 220, if compressed and the workstation cannot handle compressed data. Decompression may be accomplished using a software decompression tool 264, such as a software application, or hardware decompression 266, such as a daughter card, or the like.

According to the invention, given a group of displayed tile images in a mosaic-view, to provide a substantially smooth display of the displayed image-mosaic in the mosaic-view during mosaic-view panning, resizing, or zooming, a predictor 270, a retrieval queue 272, a cache 280 and a scheduler 274 are employed. The predictor 270 is used to determine which tile images to retrieve prior to an expected pan, resize or zoom event. The retrieval queue 272 is used to sequence the tile images to be retrieved according to priority. The scheduler 274 services the retrieval queue 272, filling up the cache 280 with tile images 134 not stored in the cache 280 or the display cache buffer, according to the sequence specified in the retrieval queue 272. Cached tile images with a lowest priority are discarded when the cache becomes full. A prediction and sequencing process will be described bellow with reference to FIG. 8. A queue servicing process will be described bellow with reference to FIG. 9. The cache 280 includes Random Access Memory (RAM) at the workstation 220, but is not limited to RAM. The cache 280 may also be a local hard-disk. Once cached, the tile images are available for display purposes via a workstation bus (not shown) which provides fast data transfer 282.

Figure 4:
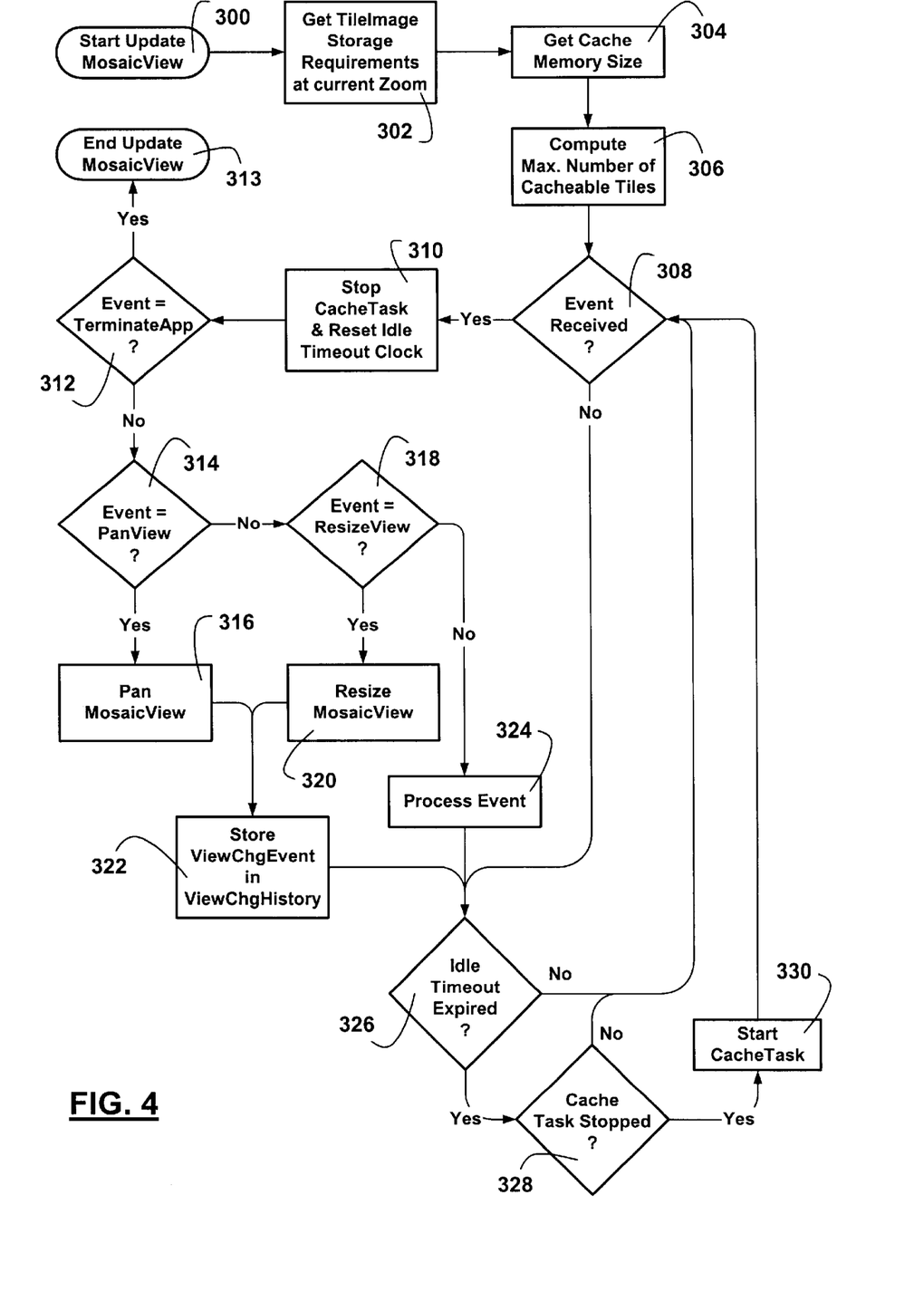
FIG. 4 is a flow diagram showing principal steps in a process by which a mosaic-view is updated in accordance with an exemplary embodiment of the invention.

FIG. 4 is a flow diagram showing a process by which a mosaic-view is updated in accordance with an exemplary embodiment of the invention. The mosaic-view update process is started in step 300. Based on a current zoom factor associated with the mosaic-view 250 (FIG. 3), storage requirements for each tile image are determined in step 302. Such storage requirements can be derived from a number of pixels associated with a tile image at the current zoom factor and perhaps a color depth or a gray scale granularity associated with each pixel. The memory size of the cache 280 is determined in step 304. The memory size of the cache 280 is typically specified by a cache memory size parameter. The cache memory size parameter is configurable. The tile image storage requirements and the cache memory size are used in step 306 to determine a maximum number of cacheable tiles.

An interactive man-machine interface such as shown in FIG. 2 is typically event driven. On receiving an event in step 308, such as a keyboard event, a mouse event, etc., a cache updating task is stopped, in step 310, to provide an immediate response to the received event. An event processing idle timeout clock is also reset to zero.

An inquiry is made in step 312 to determine whether the event received in step 308 is a request for terminating the mosaic-view update process. If so then the mosaic-view update process ends in step 313. If the received event in step 308 does not represent a request for termination, another inquiry is made in step 314 to ascertain whether the received event represents a mosaic-view panning event. If the received event is a mosaic-view panning event, then the mosaic-view is panned in step 316. A detailed description of exemplary steps in panning a mosaic-view is described below with reference to FIG. 5.

If the event received in step 308 does not represent a mosaic-view panning event, a further inquiry is made, in step 318, to ascertain whether the received event represents a mosaic-view resize event. If the received event is a mosaic-view resize event the mosaic-view is resized in step 320. A detailed description of exemplary steps in resizing a mosaic-view is described below with reference to FIG. 6.

Subsequent to panning the mosaic-view in step 316 or resizing the mosaic-view in step 320, the event received is stored as a view change event in a view change history. The view change history may be implemented as a list of view change events, the list being at least parseable from a latest to an oldest view change event. If the event received in step 308 is not a view change event, the event is not related to the present invention and is processed in step 324, as required.

When the view change history is updated in step 322, after processing the event received in step 324, or if an event is not received in step 308, the mosaic-view update process checks the event processing idle timeout clock in step 326 to determine whether an event processing idle timeout period has expired. If not, the mosaic-view update process resumes to step 308. If the event processing idle timeout is found to have expired in step 326, the cache update task is started in step 330, and the mosaic-view update process resumes in step 308. Initiation of multiple cache update tasks is prevented in step 328.

In accordance with a preferred embodiment of the invention, tile images, or portions thereof, displayed in a mosaic-view are assigned to the mosaic-view. When a mosaic-view is panned, new tile images may be displayed in the mosaic-view in the panning direction and certain of the tile images may be no longer displayed at an opposite side of the mosaic-view.

Figure 5:
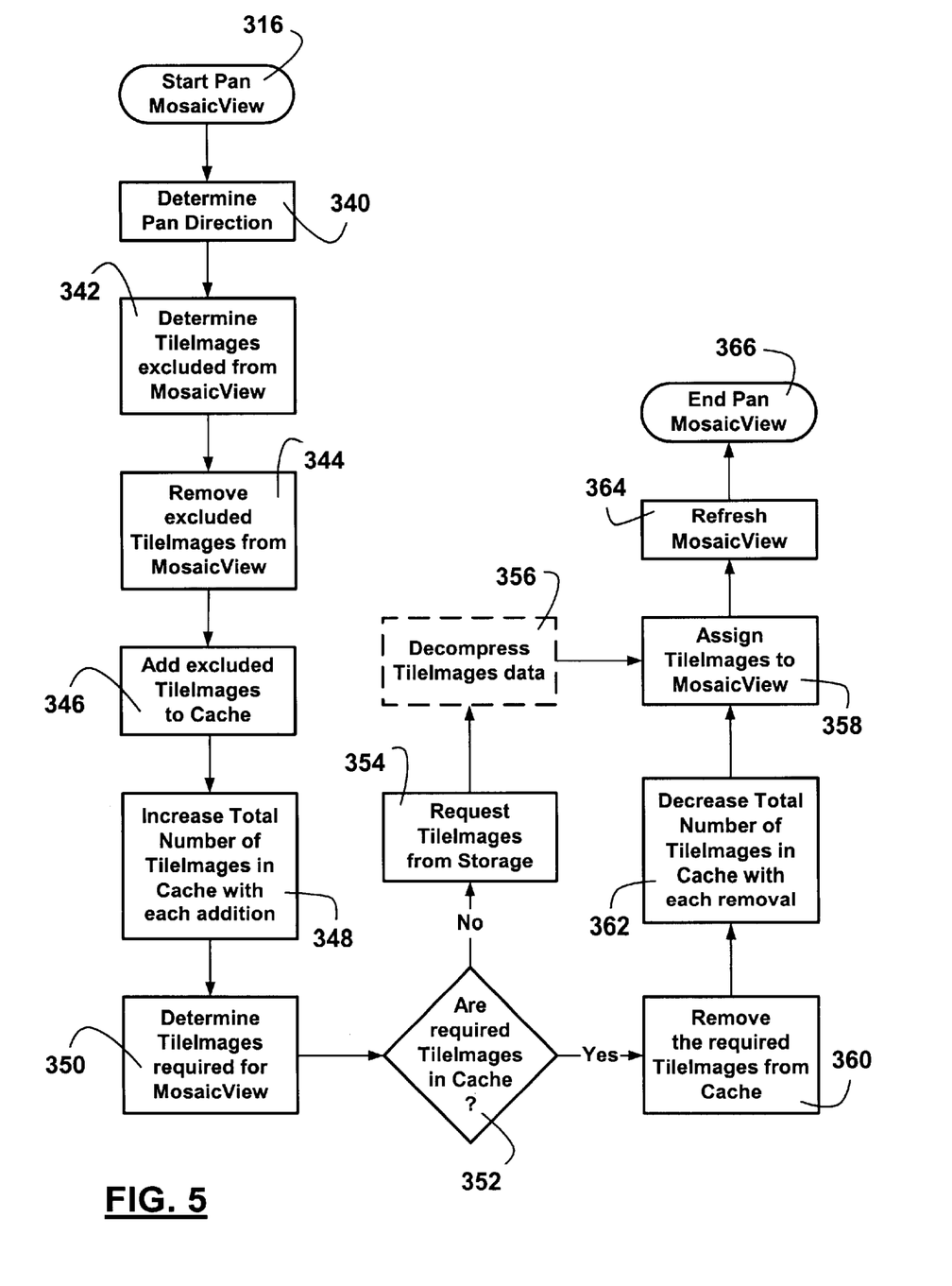
FIG. 5 is a flow diagram showing principal steps in a process by which a mosaic-view is panned in accordance with an exemplary embodiment of the invention.

FIG. 5 is a flow diagram showing principal steps in a process by which a mosaic-view is panned in accordance with an exemplary embodiment of the invention. The mosaic-view panning process is initiated in step 316 and is followed by a determination of a panning direction in step 340. A determination of tile images excluded from the mosaic-view as a result of image pan is performed in step 342. The excluded tile images are dissociated from the mosaic-view in step 344. In step 346 the excluded tile images are added to the cache 280 (FIG. 2). According to the invention, the predictive algorithm, presented with respect to FIG. 8, caches tile images in the vicinity of a mosaic-view and therefore the excluded tile images fit that requirement. A counter storing the total number of tile images in the cache is incremented by 1, in step 348, as each excluded tile image is added to the cache 280. A determination of tile images required for display in the mosaic-view as a result of the image pan is performed in step 350 and the cache 280, display memory and display cache buffer (not shown) are is searched for the required tile images in step 352. If the needed tile images are not found in the cache 280 (including display memory and display cache buffer), they are requested directly from the storage 142 (FIG. 1) in step 354. The tile images received from the storage 142 may be decompressed in step 356 prior to their assignment to the mosaic-view in step 358. If the required tile images are found in the cache in step 352, they are removed from the cache in step 260 and the total number of tile images in the cache is decremented by 1, (step 362) with each tile image removed. As each tile image is removed from cache it is assigned to the mosaic-view in step 358. Following assignment of tile images to the mosaic-view, the mosaic-view is refreshed in step 364 and the mosaic-view panning process ends in step 366.

Figure 6:
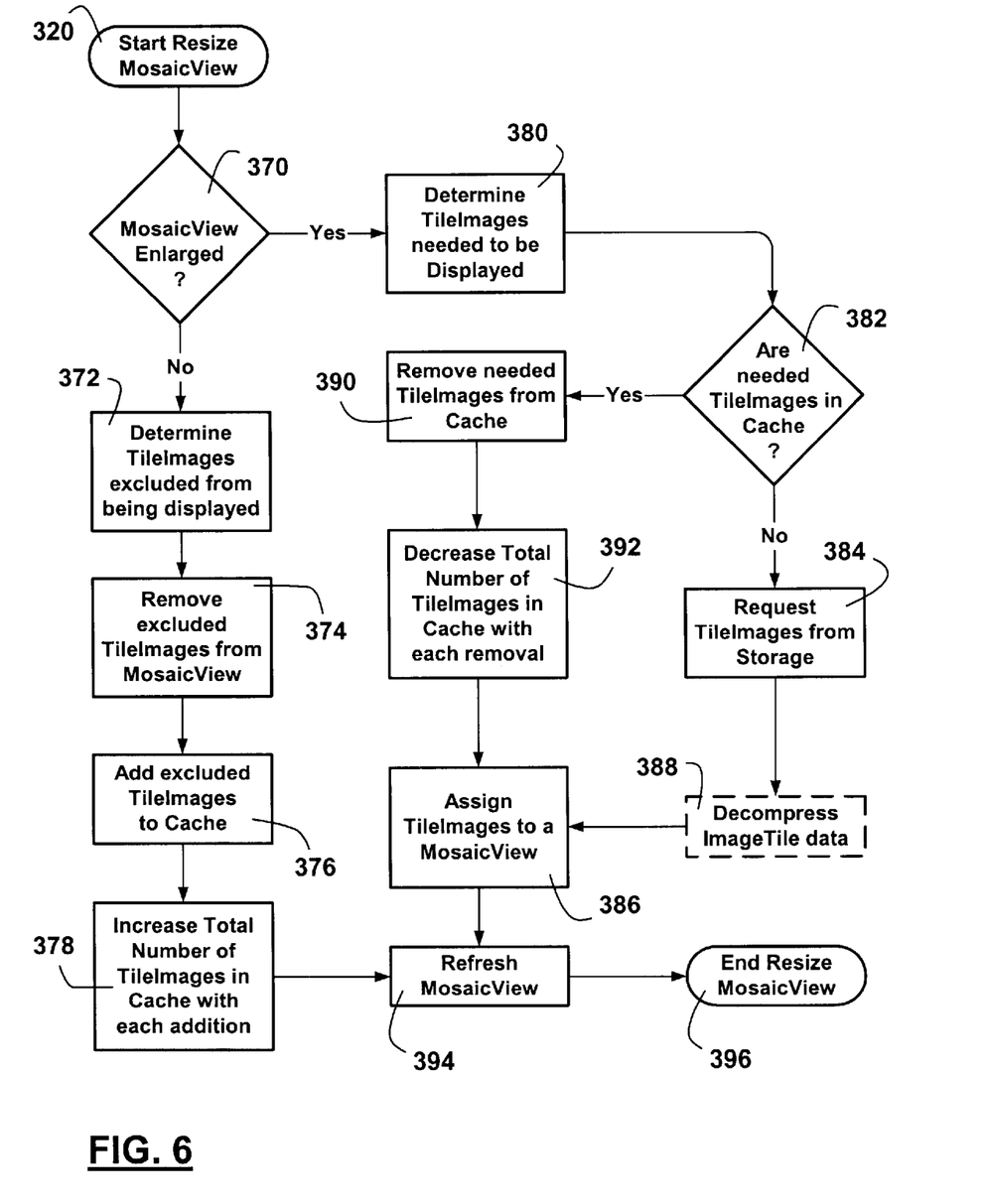
FIG. 6 is a flow diagram showing principal steps in a process by which a mosaic-view is resized in accordance with an exemplary embodiment of the invention.

FIG. 6 is a flow diagram showing a process by which a mosaic-view is resized in accordance with an exemplary embodiment of the invention. The mosaic-view resizing process is started in step 320. The mosaic-view resizing process determines in step 370 whether the mosaic-view was enlarged.

If the mosaic-view was minimized, a determination of tile images to be excluded from display is performed in step 372. The excluded tile images are removed from the mosaic view in step 374 and are added to the cache in step 376. The total number of tile images in the cache is increased by 1 with each tile image added in step 378. If the mosaic-view was found in step 372 to have been enlarged, a determination of needed tile images to be displayed is performed in step 380. The cache 280 is searched for the required tile images in step 382.

If the required tile images are not found in the cache, the required tile images are requested directly from the storage 142 in step 384. As the required tile images are received from storage they are assigned to the mosaic-view in step 386. The tile images may be decompressed in step 388 prior to their assignment to the mosaic-view. If the required tile images are found in the cache, the required tile images are removed from cache in step 390, and the total number of tile images in the cache is decremented by 1 with each tile-image removed from the cache in step 392. Each tile image removed from the cache is assigned to the mosaic-view in step 386. Following assignment of tile images to the mosaic-view or removing excluded tile images from the mosaic-view, the mosaic-view is refreshed in step 394 and the mosaic-view resizing process ends in step 396.

Figure 7:
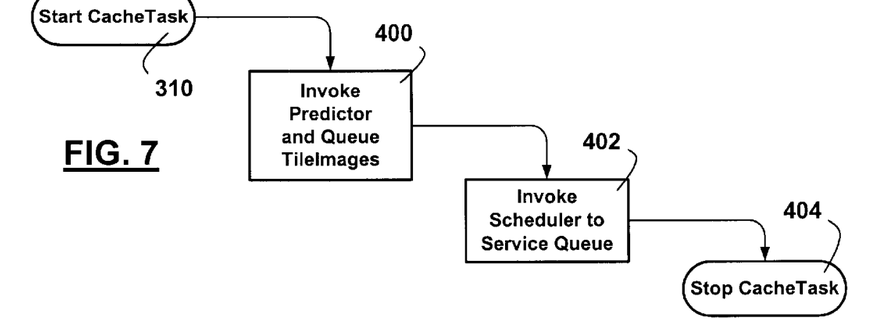
FIG. 7 is a flow diagram showing principal steps in an overall process by which tile image caching is implemented in accordance with an exemplary embodiment of the invention.

FIG. 7 is a flow diagram showing an overall process by which tile image caching is implemented in accordance with an exemplary embodiment of the invention. The cache update task can be implemented as a parallel process coordinated with the man-machine interface as shown above with reference to FIG. 4. The cache update task, started in step 310, includes invoking a predictor to sequence tile image requests in the retrieval queue 272 (FIG. 2), step 400. A scheduler is invoked to service the retrieval queue in step 402. After all the requests for tile image retrieval have been serviced and all the requested tile images are stored in the cache 280 or the cache becomes full, the tile image caching task ends in step 404.

Figure 8:
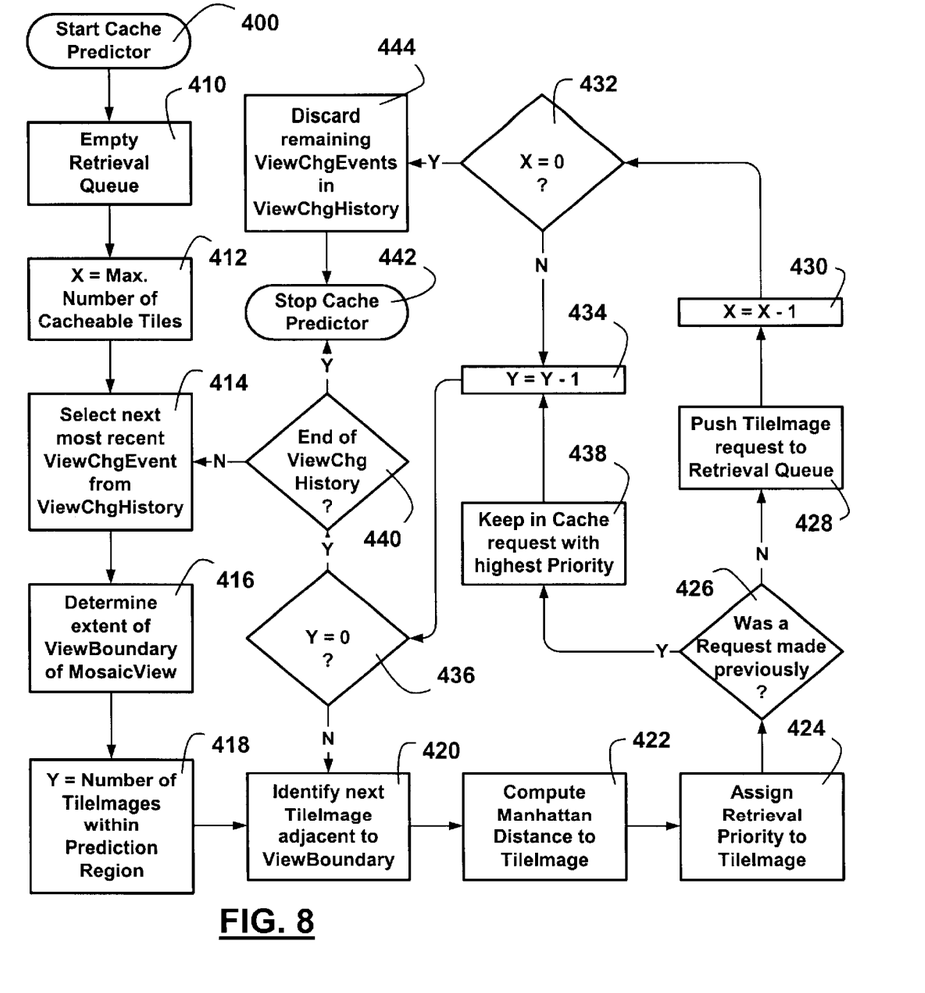
FIG. 8 is a flow diagram showing principal steps in a process by which tile images are queued for retrieval using a predictive algorithm in accordance with an exemplary embodiment of the invention.

FIG. 8 is a flow diagram showing a process by which tile images are queued for retrieval using a predictive algorithm in accordance with an exemplary embodiment of the invention. The cache predictor is started in step 400 and the retrieval queue 272 (FIG. 2) is cleared in step 410. A counter X is initialized (step 412), with a maximum number of cacheable tiles determined as described above with reference to FIG. 4. The view change history is consulted and the most recent view change event is selected in step 414. The extent of the view-boundary of the mosaic-view is determined in step 416. Based on the extent of the view-boundary, a counter Y is initialized (step 418) with a number of tile images within a prediction region about the mosaic-view. According to an embodiment of the invention, the number of tile images in the prediction region is determined using Cartesian distances between the view-boundary and tile images in the vicinity of the view-boundary. According to a preferred embodiment of the invention, the number of tile images in the prediction region is determined using Manhattan distances between the view-boundary and tile images in the vicinity of the view-boundary. Calculation of Manhattan distances are know in the art of semiconductor integrated circuit design and will be explained in detail below with reference to FIG. 10. Although only Cartesian and Manhattan based prediction are described, the invention is not limited to those two methods.

A tile image in the vicinity of the view-boundary is identified and selected in step 420. A computation of the Manhattan distance between the selected tile image and the mosaic-view is performed in step 422. A retrieval priority is assigned in step 424, based on the Manhattan distance between the tile image and the view-boundary. Another factor considered in calculating retrieval priorities in addition to the Manhattan distance, is the relative position of the currently processed view change event in the view change history. The retrieval queue 272 (FIG. 2) is consulted in step 426 to ascertain if a request for the tile image is already in the retrieval queue. If a request for the tile image is not found in the retrieval queue, a retrieval request for the tile image is created and pushed onto the retrieval queue in step 428 with the assigned retrieval priority calculated in step 424. The counter X is then decremented by 1 in step 430.

If the maximum cache size has not been reached, as determined in step 432, the counter Y is decremented by 1 in step 434. If there are tile images in the prediction range to be queued for retrieval, as determined in step 436, the tile image queuing process resumes from step 420.

It may be determined in step 426 that a request for retrieving a tile image was previously made. It may be that multiple view-boundaries corresponding to sequential view change events are close enough that the prediction regions overlap. In this case the previous request for the tile image is kept in the queue but the highest retrieval priority of the two requests is associated with the queued request, step 438. The queuing process then resumes from step 434. Alternatively, it may be determined in step 436 that that all tile images within the prediction distance of the current view change event have been queued. If so, the queuing process checks in step 440 whether the end of the view change history has been reached. If the end of the view change history has not been reached, the queuing process resumes from step 414. If the end of the view change history has been reached, the queuing process ends at step 442. It may also be determined in step 432 that the maximum cache size has been reached. In that case all remaining view change events in the view change history are discarded in step 444 and the queuing process ends in step 442. It should be understood that alternatively, the view change history can be used only for cache prediction purposes to compute priorities for retrieval of images surrounding the current view. In that case, the view change history is not processed serially as described above.

Figure 9:
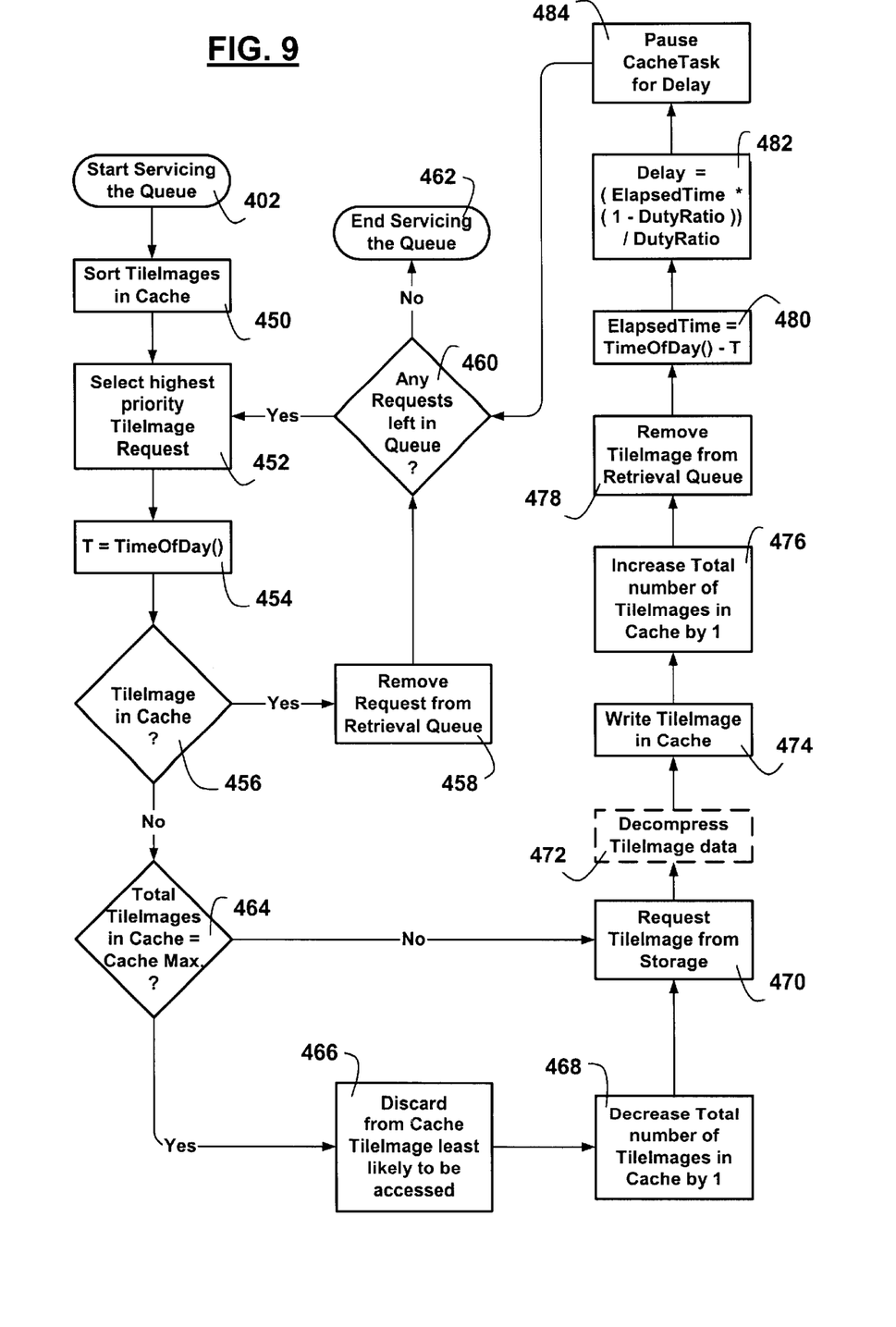
FIG. 9 is a flow diagram showing principal steps in a process by which a file image retrieval queue is serviced in accordance with an exemplary embodiment of the invention.

FIG. 9 is a flow diagram showing a process by which a retrieval queue is serviced in accordance with an exemplary embodiment of the invention. The queue servicing process starts in step 402 followed, in step 450, in accordance with the preferred embodiment of the invention, by sorting the tile images in the cache according to their priority. As described above, priority calculations include Cartesian or Manhattan distances as well as view history weighting, but are not limited to those methods. In accordance with another embodiment of the invention the access priorities of tile images in the cache are calculated and the tile images are sorted, in step 450, according to access priority. Access priority can be calculated in a manner similar to the calculation of the retrieval priorities mentioned above.

In step 452, a tile image request with the highest retrieval priority is selected from the retrieval queue 272. The time of day is stored in a variable T (step 454) to determine a time required to service one tile image request in the retrieval queue 272. The cache is checked, in step 456, to ascertain whether the tile image specified in the request is already in the cache or the display cache buffer. If the tile image is in the cache or the display cache buffer, the request is removed from the retrieval queue in step 458. The queue servicing process checks, in step 460, whether there are any other requests in the retrieval queue. If there is at least one request in the retrieval queue, the queue servicing process resumes at step 452. If there are no more requests left in the retrieval queue then the queue servicing process ends in step 462.

If in step 456, the tile image specified in the request is not located in the cache or the display cache buffer, the queue servicing process checks (step 464) whether the total number of tile images stored in cache has reached the maximum number of tile images to be cached, which was calculated in step 306. If the maximum number of tile images to be cached has been reached, a tile image least likely to be accessed in the near future is discarded from the cache in step 466. The tile image least likely to be accessed is the tile image from the group of tile images with lowest priority. Following the tile image discard, the total number of tile images in cache is decremented by 1 in step 468.

If the maximum number of tile images to be stored in cache has not been reached in step 464 or subsequent to discarding from the cache the tile image least likely to be accessed, the tile image specified in the queued request is requested from the storage 142 (FIG. 1) in step 470. The received tile image may be decompressed in step 472 (if required) and written to the cache in step 474. The total number of tile images in the cache is incremented by 1 in step 476. The tile image request just serviced is removed from the retrieval queue in step 478. As will be understood by those skilled in the art, some workstations can handle uncompressed data. If so, the number of images that can be stored in cache cannot be predicted. Consequently, images are stored in cache until the cache becomes full, and caching is then stopped.

In either case, the time elapsed since the start of the request servicing in step 454 is determined in step 480. The time elapsed in servicing individual requests is used by the scheduler 274 (FIG. 2) to interleave servicing the retrieval queue with other processing tasks running on the workstation 220. A queue servicing processing delay is calculated in step 482, and the cache update task is paused for that delay in step 484. The queue servicing process resumes from step 460.

An exemplary way of calculating the queue servicing processing delay in step 482 uses a variable duty ratio parameter which specifies the proportion of processing time to be used for servicing the retrieval queue on a request-by-request basis. The following are exemplary equations used in calculating the processing delay:

$$\text{ElapsedTime} = \text{TimeOfDay}(\ ) - T \quad \text{(Equation 1)}$$

$$\text{Delay} = \frac{\text{ElapsedTime} * (1 - \text{DutyRatio})}{\text{DutyRatio}} \quad \text{(Equation 2)}$$

The invention is not limited to this type of self-processing control. Other means of effecting control over the cache update task may be employed using facilities available in a multi-threaded, multi-tasking operating system running on the workstation 220. If the cache update task is implemented as an execution thread, the percentage of processing time allotted to the caching thread can be adjusted at the operating system level. One such example makes use of a "nice" facility, such as is available in UNIX operating systems.

Figure 10:
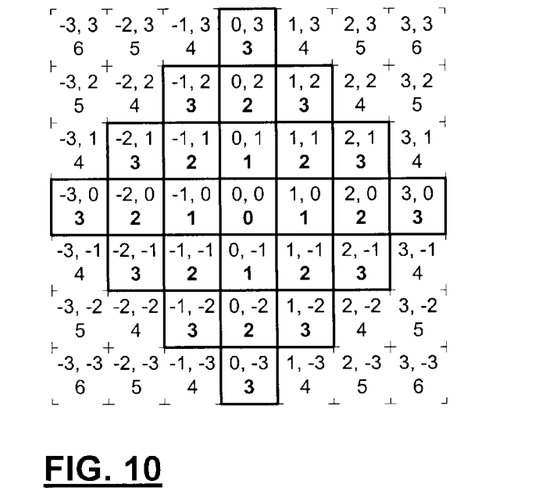
FIG. 10 is a schematic diagram showing a mosaic-view including one tile image, relative positions of neighboring tile images within a prediction distance and relative Manhattan distances between the viewed tile image and each one of the neighboring tile images in accordance with an exemplary embodiment of the invention.

FIG. 10 is a schematic diagram showing a mosaic-view including one tile image, and relative positions of neighboring tile images within a prediction distance in accordance with an exemplary embodiment of the invention. The central tile image is shown to have a (0,0) relative position on a tile grid from which Manhattan distances are calculated to other tile images. The extent of the prediction region may be controlled by a prediction range parameter which for the purposes of the example shown in FIG. 10 is set to 3.

Manhattan distances to tile images are calculated by adding an absolute value of the x and y components of the relative position of a tile image with respect to the displayed central tile image. Retrieval priorities may be calculated by computing an inverse of the Manhattan distance. The units in which the Manhattan distance is calculated can be a mosaic-view side length, but is not limited to that method.

Manhattan distance based retrieval priority calculation is well suited for extraction of design and layout information in reverse-engineering ICs because Manhattan distances are typically paned to follow traces on ICs employing 90 degree trace designs. FIG. 10 shows in solid lines all the tiles in a diamond shaped prediction region controlled by a prediction range parameter of 3.

Figure 11:
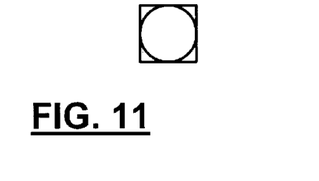
FIGS. 11 to 16 are schematic diagrams showing a progression of a retrieval of tile images in accordance with an exemplary embodiment of the invention adapted for panning views displaying portions of image-mosaics of sample ICs having 90 degree trace geometries.
Figure 12:
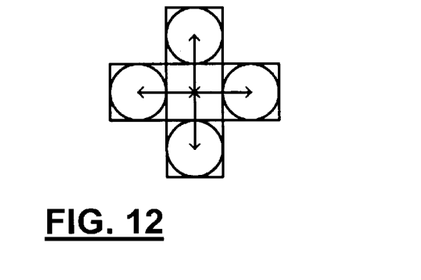
Figure 13:
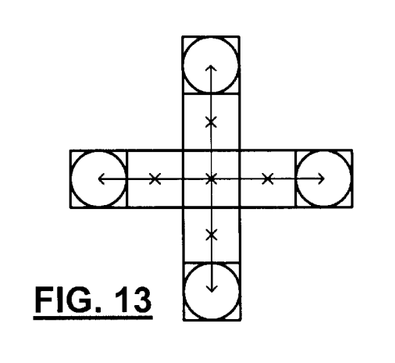
Figure 14:
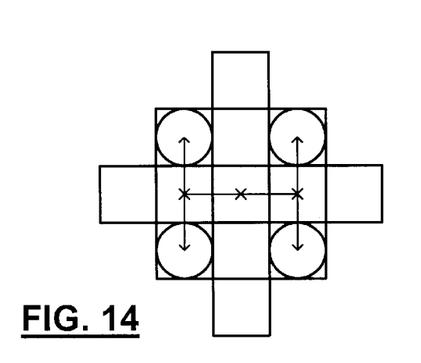
Figure 15:
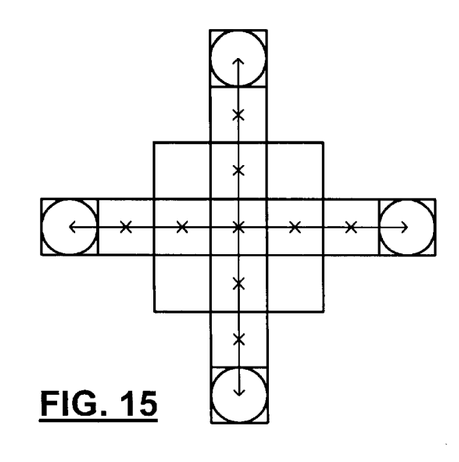
Figure 16:
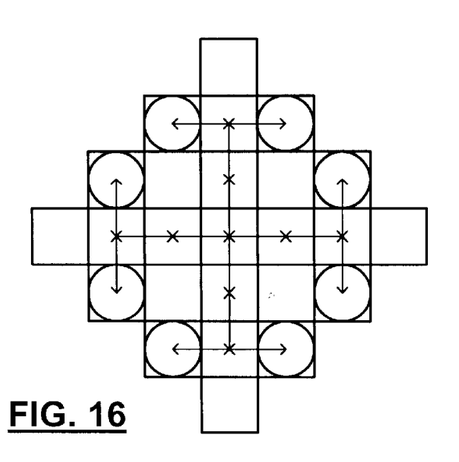
Figure 17:
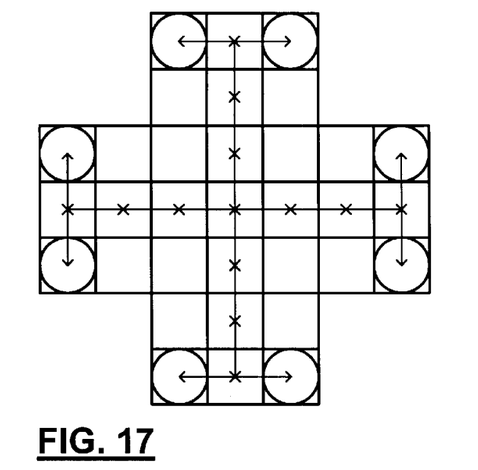
FIGS. 17 to 20 are schematic diagrams showing another progression of a retrieval of tile images in accordance with another exemplary embodiment of the invention adapted for panning views displaying portions of image-mosaics of sample ICs having 45 degree trace geometries.
Figure 18:
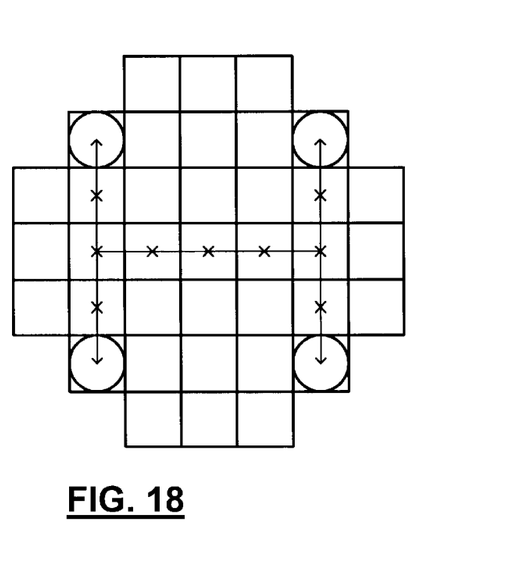

FIGS. 11 to 16 are schematic diagrams showing a progression of a retrieval of tile images in accordance with an exemplary embodiment of the invention adapted for panning views displaying portions of image-mosaics of sample ICs having 90 degree geometries. FIG. 11 shows the display of the central tile image in the mosaic-view. FIG. 12 shows the caching of tile images 1 Manhattan unit away from the displayed tile image in the mosaic-view. FIGS. 13 and 14 show the caching of tile images 2 Manhattan units away from the displayed tile image in the mosaic-view. FIGS. 15 and 16 show the caching of tile images 3 Manhattan units away from the displayed tile image in the mosaic-view. The diamond shape of the arrangement of the tile images in the prediction range gives preference to horizontal or vertical pans typically used for following traces at 90 degrees. ICs employing 90-degree trace designs are very prevalent.

ICs having trace designs at other angles such as 45 degrees are known, however, in order to accommodate the reverse-engineering of ICs employing a 45 degree trace design, for example, the predictor can be instructed to cache tile images forming a square whose sides and corners are the same prediction range (3) away from the displayed tile images. FIG. 10 also shows the location of the predicted tile images in enabling smooth 45 degree diagonal panning of the mosaic-view.

Figure 19:
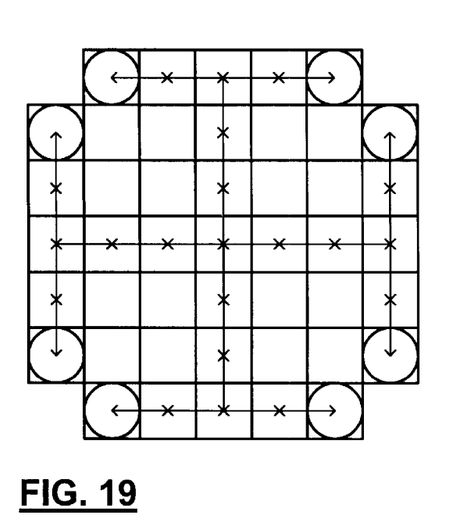
Figure 20:
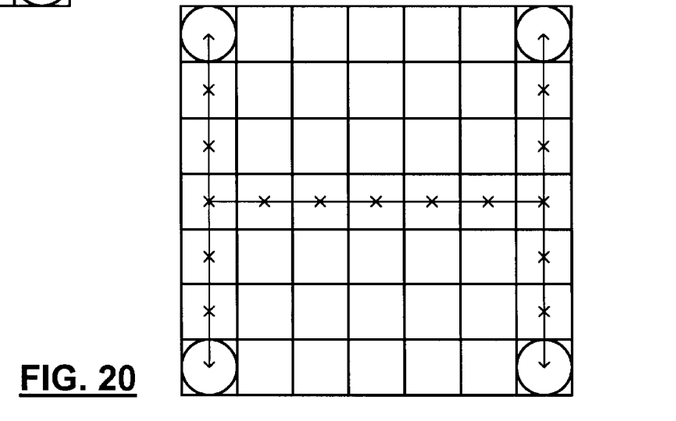

FIGS. 11 to 20 are schematic diagrams showing another progression of a retrieval of tile images enabling smooth 45 degree diagonal panning of the mosaic-view. In addition to the caching of tile images described above with respect to FIGS. 11 to 16, FIGS. 17 and 18 show the caching of tile images 4 Manhattan units away from the displayed tile image in the mosaic-view. FIG. 19 shows an intermediate point in the caching of tile images 5 Manhattan units away from the displayed tile image in the mosaic-view. FIG. 20 shows an intermediate point in the caching of tile images 6 Manhattan units away from the displayed tile image in the mosaic-view.

As will be understood by those skilled in the art, mosaic-views may display a plurality of tile images. The algorithms described above may also be applied to the display of a plurality of mosaic-views, especially during zooming across mosaic-views. Those skilled in the art will also understand that the tile images need not be displayed at only one zoom factor.

The embodiments of the invention described above are intended to be exemplary only. The scope of the invention is therefore intended to be limited solely by the scope of the appended claims.

We claim:

1. An algorithm for caching tile image constituents of an image-mosaic to facilitate the panning or resizing of a mosaic-view displayed on an event driven man-machine interface, at least a portion of the image-mosaic consisting of a plurality of tile images assembled in a contiguous, juxtaposed relationship, comprising:
   a) a caching predictor for computing a retrieval priority for each tile image surrounding the panned or resized mosaic-view in a predetermined pattern and to a predetermined extent; and
   b) a tile image retrieval process that retrieves tile images from storage and adds the images to the cache in accordance with the priority assigned by the caching predictor.

2. An algorithm as claimed in claim 1, wherein the algorithm further computes, in the predetermined pattern and to the predetermined extent, a retrieval priority for each tile image surrounding previously displayed mosaic-views until a maximum cache size is exhausted.

3. An algorithm as claimed in claim 1, wherein the caching predictor executes at the expiry of an event processing idle timeout period subsequent to the mosaic-view being changed in response to a view change event.

4. An algorithm as claimed in claim 3, wherein view change events are stored in a view change history.

5. An algorithm as claimed in claim 4, wherein a geometry of previously displayed mosaic-views is extracted from the view change events stored in the view change history.

6. An algorithm as claimed in claim 5, wherein the predetermined pattern gives priority to retrieval of tile images enabling smooth, substantially real-time panning of the mosaic-view to enhance following traces oriented at 90 degrees relative to an edge of the IC.

7. An algorithm as claimed in claim 6, wherein the predetermined pattern is a diamond-shaped region.

8. An algorithm as claimed in claim 5, wherein the predetermined pattern gives priority to retrieval of tile images enabling smooth, substantially real-time panning of the mosaic-view in following traces oriented at 45 degrees relative to an edge of the IC.

9. An algorithm as claimed in claim 8, wherein the predetermined pattern is rectangular region.

10. An algorithm as claimed in claim 8, wherein the predetermined extent in computing retrieval priorities is specified via a prediction range parameter.

11. An algorithm as claimed in claim 1, wherein the caching predictor uses Manhattan distances from displayed tile images and tile images to be retrieved from cache to compute retrieval priorities for tile images to be retrieved.

12. An algorithm as claimed in claim 1, wherein the predictor calculates Cartesian distances between displayed tile images and tile images to be retrieved from cache to compute retrieval priorities for tile images to be retrieved.

13. An algorithm as claimed in claim 1, wherein the storage is remotely accessible through a Local Area Network (LAN), and the retrieval of tile images is subject to network data transfers.

14. An algorithm as claimed in claim 13, wherein the retrieval process is intermittent, as determined by a variable duty ratio parameter that inhibits excessive use of data transfer resources and provides a computing resources sharing mechanism in the operation of the man-machine interface.

15. An algorithm as claimed in claim 14 wherein a length of time used to retrieve one tile image from storage is computed, and a respective delay is determined in accordance with the variable duty ratio, and the retrieval process is paused for a duration of the determined delay.

16. An algorithm as claimed in claim 1, wherein the tile image retrieval process checks the cache and display memory to determine if the cache already contains a tile image specified in a tile image retrieval request, and discards the request on determining that the specified tile image is in the cache.

17. An algorithm as claimed in claim 1, wherein the tile image retrieval process is governed by a predetermined maximum number of cacheable tile images, and adds retrieved tile images to the cache until the maximum number of cacheable tile images are cached, and discards all remaining requests.

18. An algorithm as claimed in claim 17, wherein if during the addition of retrieved tile images to the cache, it is determined that a maximum cache size has been reached, then tile images of lowest priority are discarded from the cache.

19. An algorithm as claimed in claim 18, wherein the tile images of lowest priority are identified by a caching algorithm that computes priority based on proximity and view history.

20. An algorithm as claimed in claim 19, wherein the priority is determined employing Manhattan distance calculations.

21. An algorithm as claimed in claim 19, wherein the priority is determined employing Cartesian distance calculations.

22. An algorithm as claimed in claim 18, wherein the priority is influenced by being associated with an older view change event.

23. A display apparatus for displaying on an event driven man-machine interface a plurality of tile images assembled into an image-mosaic to provide a substantially smooth, real-time display of portions of the image-mosaic on the man-machine interface in response to interaction events, the apparatus comprising;

a) a predictor monitoring interaction events serviced by the man-machine interface for the purposes of prioritizing the downloading of tile images within a prediction region located around displayed tile images;

b) a retrieval queue for sequencing the retrieval of the tile images;

c) a cache storing the retrieved tile images; and d) a scheduler for controlling use of computation time used to update the cache.

24. A display apparatus as claimed in claim 23, wherein the event driven interface further comprises at least one mosaic-view displaying tile images assembled to form at least a portion of an image-mosaic.

25. A display apparatus as claimed in claim 23, wherein the mosaic-view has an associated zoom factor and the tile images assembled into the image-mosaic displayed share the associated zoom factor.

26. A display apparatus as claimed in claim 23, wherein the high capacity data storage includes high capacity data storage remotely accessible through a data transport network.

27. A display apparatus as claimed in claim 26, wherein tile image data is conveyed over the data transport network in a compressed form.

28. A display apparatus as claimed in claim 23, wherein the high capacity data storage stores compressed tile image data and the system further comprises decompression means for decompressing the compressed tile image data.

29. A display apparatus as claimed in claim 28, wherein the decompression means comprises a software decompression mechanism.

30. A display apparatus as claimed in claim 28, wherein the decompression means further comprises a hardware decompression mechanism.

31. A display apparatus as claimed in claim 23, wherein the cache comprises one of a Random Access Memory (RAM) and a hard disk.

\* \* \* \* \*